US009742847B2

(12) United States Patent
Estevez et al.

(10) Patent No.: US 9,742,847 B2
(45) Date of Patent: Aug. 22, 2017

(54) NETWORK NODE PHYSICAL/COMMUNICATION PINS, STATE MACHINES, INTERPRETER AND EXECUTOR CIRCUITRY

(71) Applicant: Texas Instruments Incorporated, Dallas, TX (US)

(72) Inventors: Leonardo William Estevez, Rowlett, TX (US); Sriram Narayanan, Richardson, TX (US)

(73) Assignee: Texas Instruments Incorporated, Dallas, TX (US)

( * ) Notice: Subject to any disclaimer, the term of this patent is extended or adjusted under 35 U.S.C. 154(b) by 272 days.

(21) Appl. No.: 14/015,849

(22) Filed: Aug. 30, 2013

(65) Prior Publication Data

US 2015/0067119 A1 Mar. 5, 2015

(51) Int. Cl.
*G06F 15/173* (2006.01)
*H04L 29/08* (2006.01)

(52) U.S. Cl.
CPC .............. *H04L 67/12* (2013.01); *H04L 67/34* (2013.01)

(58) Field of Classification Search
CPC ........ G06F 1/3203; H04L 67/12; H04L 67/34
USPC ........................................................ 709/223
See application file for complete search history.

(56) References Cited

U.S. PATENT DOCUMENTS

| | | | |
|---|---|---|---|
| 5,317,757 A * | 5/1994 | Medicke et al. ............... | 712/229 |
| 5,412,260 A * | 5/1995 | Tsui ............... | G01R 31/318555 326/16 |
| 5,539,739 A * | 7/1996 | Dike et al. ..................... | 370/352 |
| 5,903,566 A * | 5/1999 | Flammer, III ................ | 370/406 |
| 6,928,505 B1 * | 8/2005 | Klingman ........... | G06F 13/4295 710/110 |
| 7,208,916 B1 * | 4/2007 | Boatwright ......... | H01M 10/486 320/150 |
| 2005/0182977 A1 * | 8/2005 | Powers et al. ................ | 713/300 |
| 2006/0015653 A1 * | 1/2006 | Lum et al. ........................ | 710/5 |
| 2006/0053315 A1 * | 3/2006 | Menzl ........................... | 713/300 |

(Continued)

OTHER PUBLICATIONS

U.S. Appl. No. 13/433,546, filed Mar. 29, 2012, entitled "Sensor Power Management".

(Continued)

*Primary Examiner* — Oleg Survillo
*Assistant Examiner* — Tan Doan
(74) *Attorney, Agent, or Firm* — Lawrence J. Bassuk; Charles A. Brill; Frank D. Cimino (57) ABSTRACT

A network of sensor and controller nodes having the ability to be dynamically programmed and receive updated software from one another, and from a host system. Each network node includes multiple state machines, at least some of which are operable relative to physical pins at the network node; the physical pins correspond to inputs from sensor functions or outputs to control functions. The network nodes include microcontrollers that are operable in an operating mode to execute a state machine and respond to commands from other nodes or the host, and in a read mode to receive and store program instructions transmitted from other nodes or the host. A learn mode is also provided, by way of which a network node can store program code corresponding to instructions and actions at the node when under user control.

18 Claims, 6 Drawing Sheets

(56) References Cited

U.S. PATENT DOCUMENTS

| | | | | |
|---|---|---|---|---|
| 2007/0283072 A1* | 12/2007 | Johnson | ............ | G06F 11/3664 |
| | | | | 710/305 |
| 2010/0201516 A1* | 8/2010 | Gelvin et al. | ............ | 340/539.26 |
| 2011/0074596 A1* | 3/2011 | Frohlick | ................ | G01D 21/00 |
| | | | | 340/691.1 |
| 2012/0144256 A1* | 6/2012 | Bailey | ................ | G01R 31/3177 |
| | | | | 714/738 |
| 2013/0205171 A1* | 8/2013 | Jung | ............................... | 714/37 |

OTHER PUBLICATIONS

Tan et al., "Future Internet: The Internet of Things", 3rd Int'l. Conf. on Advanced Theory and Engineering (IEEE, 2010), pp. V5-376-V5-380.
Roggen et al., "Opportunistic Human Activity and Context Recognition", Computer (IEEE, Feb. 2013), pp. 37-45.
Lee et al., "Applying Human Learning Principles to User-Centered IoT Systems", Computer (IEEE, Feb. 2013), pp. 46-52.

* cited by examiner

NETWORK NODE PHYSICAL/COMMUNICATION PINS, STATE MACHINES, INTERPRETER AND EXECUTOR CIRCUITRY

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

This invention is in the field of distributed networked electronic systems.

Networked communications among computer systems have been dominated to date by human-oriented communications. Internet communications are a good example of these human-oriented communications, as these are typically carried out by way of computers (including personal computers, tablet computers, smartphones and other mobile devices) actively operated by a human to access or transmit information from and to another such computer or from and to a server.

A recent trend, however, is the increasing deployment of networked communications among computer systems and other electronic devices themselves, absent human initiation or control of the communications. These machine-to-machine ("M2M") communications are now being carried out over a wide-area network, and the resulting network is now often referred to as the "Internet of Things" ("IoT"). In this context, the nature of the communications can differ significantly from conventional human-oriented Internet communications. The amount of data transmitted from one "machine" to another in a given transmission is often quite small (e.g., streaming video is not often involved), and is often not particularly time-sensitive. As such, the communications requirements for the IoT can be somewhat relaxed. On the other hand, the number of machine-to-machine network nodes in the future is contemplated to be substantially larger than the number of nodes in the human-oriented Internet.

Automated facilities management is an example of a function that is well-suited to being carried out by M2M communications. In this context, a number of sensors can be installed at many various locations of the facility, for example for sensing temperature, humidity, ambient light level, the presence of humans nearby, and other environmental parameters. Other sensors and controllers may be installed on industrial or HVAC equipment that effect the environment. Communications among these sensors and controllers and a host system need only occur at relatively low frequency (e.g., sampling frequency on the order of tenths of Hz, at most), yet if the number of sensors and controllers is sufficiently large, efficient and intelligent control of the facilities environment can be implemented.

Industrial and process control applications, large-scale data gathering for scientific study, and the like are other systems in which M2M (or IoT) networks can provide particular benefit.

In the context of IoT networked communications, automated sensors and their deployment are of particular importance, as it is sensors that obtain the observation data to be communicated among the networked machines. Those observations provide the context for the control of the environment of the sensors by controllers and actuators, which may also be in the M2M network with the sensors. Copending and commonly assigned U.S. patent application Ser. No. 13/433,546, filed Mar. 29, 2012, entitled "Sensor Power Management", incorporated herein by reference, describes an example of a power management arrangement useful in a sensor node (i.e., one node in the network). Such power management is particularly useful in an M2M implementation of a large number of sensors, for example to conserve sensor battery power during operation.

The number of nodes in some modern installations of M2M networks can exceed one thousand, each of those nodes corresponding to a sensor, controller, or both a sensor and a control function, and operating under software control. In such very large scale networks, the cost of initially programming, and especially of updating, the program code at each of these nodes can be prohibitive. Furthermore, it may not be possible to accurately predict the particular environment or even the function of a particular network node prior to deployment—in many cases, the sensor or control function that becomes desired in practice may not be foreseeable at the time of installation. The functionality and flexibility of conventional M2M sensor networks implemented using current technology is thus somewhat limited.

By way of further background, many mobile telephone devices include processors that implement "virtual machines" to securely execute interpreted platform-independent program code. Examples of such virtual machines include the Dalvik virtual machine in the ANDROID operating system available from Google Inc., and virtual machines for executing JAVA programs and processes. By way of further background, modern embedded processor platforms, such as the ARDUINO microcontroller platform, use compiled executable code (referred to as a "sketch") that is based on pin abstractions referred to as a "wiring" software library.

BRIEF SUMMARY OF THE INVENTION

Embodiments of this invention provide a system of networked sensors and controllers, and method of operating the same, implementing a virtual machine for embedded computing platforms that operates in an interpreted environment to provide dynamic programming and control Embodiments of this invention provide such a method and system in which the program code and thus the functionality of individual sensors and controllers can adapt to changes in the environment.

Embodiments of this invention provide such a method and system in which sensors and controllers can securely and reliably adapt the program code and thus the functionality of other sensors and controllers in the network.

Embodiments of this invention provide such a method and system in which the overall functionality of the system of networked sensors and controllers can be adaptively implemented and modified in response to sensed conditions.

Embodiments of this invention provide such a method and system in which the sensors and controllers are adaptable in a manner that minimizes latency and power consumption.

Embodiments of this invention provide such a method and system in which the program code of the sensors and controllers adapt or are adapted without interrupting current processing.

Embodiments of this invention provide such a method and system that is suitable for use in low energy communications (e.g., Bluetooth Low Energy) environments, and in memory-constrained devices.

Other objects and advantages of embodiments of this invention will be apparent to those of ordinary skill in the art having reference to the following specification together with its drawings.

Embodiments of this invention may be implemented into one or more distributed network nodes, corresponding to a sensor, controller, or both, executing a plurality of state machines. An interpreter function is provided at each node for receiving and storing, in a "read" operational mode, individual lines of program code associated with a specific one of its state machines, for initiating or modifying the function of the state machine at that node. In some embodiments, a "learn" operational mode is provided, by way of which the node programs itself according to executed code and sensed conditions.

DETAILED DESCRIPTION OF THE INVENTION

This invention will be described in connection with its embodiments, namely as implemented into a network of sensors and controllers implemented by way of programmable logic, as it is contemplated that this invention will be especially beneficial when realized in that manner. However, it is contemplated that the flexibility and adaptability provided by this invention will be useful in a wide range of applications beyond those described in this specification. Accordingly, it is to be understood that the following description is provided by way of example only, and is not intended to limit the true scope of this invention as claimed.

Figure 1:
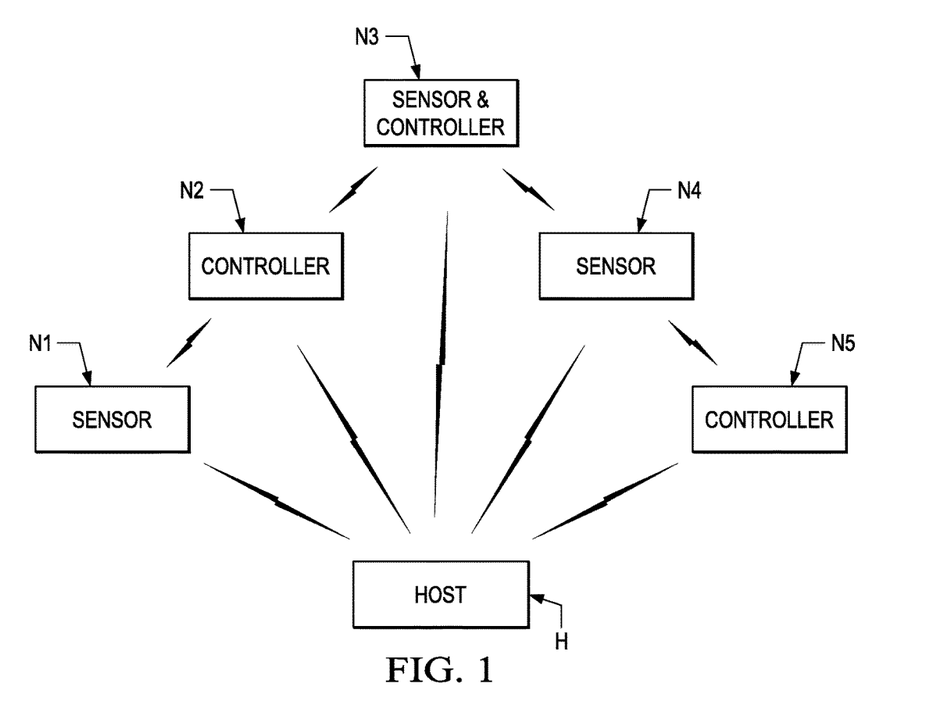
FIG. 1 is an electrical diagram, in block form, of an installation of a distributed networked system of controllers and sensors, in which embodiments of this invention are implemented.

FIG. 1 is a block diagram illustrating the deployment of a distributed network system in which embodiments of this invention may be deployed. As discussed above in connection with the Background of the Invention, some modern networked systems consist of a number of sensors and controllers that contain significant computational capacity and that are capable of communicating with one another, for example by way of wireless communications. The number of nodes (i.e., the sensors, controllers, or both) in such a network can range from several nodes to on the order of hundreds, depending on the particular application. Such networks have become attractive in the contexts of facilities management (e.g., for environmental control and security management) and industrial control (e.g., control of motors and valves).

In the high-level example of FIG. 1, several nodes N1 through N5 are illustrated as in communication with one another and with host H. Typically, as discussed above, these nodes N1 through N5 (collectively referred to in this specification, in general, as nodes N) are contemplated to be deployed at various locations in a facility or environment, for example at locations in one or more rooms of a facility, at various locations outdoors, and at one or more pieces of industrial equipment. As the example of FIG. 1, nodes N1, N4 serve only or primarily as sensors, nodes N2, N5 serve only or primarily as controllers, and node N3 performs both a sensor function and a controller. For purposes of this description, the term "node" will refer to an installed electronic system or sub-system capable of serving as a sensor, or as a controller, or both, and that has a communications function for communicating with other nodes, and a host system, in a networked arrangement. In any case, the number of nodes performing particular functions in the overall network can vary. According to embodiments of this invention, as will be described in further detail below, the functions performed by a given node and the manner in which those functions are performed can change over time, both in response to commands from other network nodes and in response to conditions sensed at other network nodes. As such, and as will also be described below, each of nodes N include computational circuitry, such as a microcontroller, microprocessor, or other large-scale programmable logic.

Host H is also present in this network. Host H is realized by a computer system, such as a computer or workstation installed at or near the facility or environment at which nodes N are placed. Alternatively, host H may be a portable computing system, such as a laptop or tablet computer, smartphone, or the like, that is temporarily in the vicinity of nodes N. As will be described in further detail below, host H includes sufficient computational capacity and memory to allow it to install and modify program code at each node N.

As shown in FIG. 1, host H and nodes N1 through N5 are in communication with one another, wirelessly in this example. In embodiments of this invention, it is contemplated that host H will typically be in communication with each node N, and that each particular one of nodes N1 through N5 will be in communication with at least one if not all of the others of nodes N1 through N5. In the case of wireless communication, the manner in which such communication is carried out may follow any one of a number of conventional protocols and physical layer standards, including IEEE 802.11a/b/g/n etc., Bluetooth, and Bluetooth 4.0 (i.e., Bluetooth Low Energy, or "BLE"). As known in the art, BLE communications are constrained to application payloads of twenty bytes, in order to minimize power consumption. Embodiments of this invention are able to take advantage of the low power of BLE communications, by utilizing a reduced instruction set programming language, with overloaded instructions that refer to "pins", so that relatively complex programs can be communicated in as little as a single BLE packet. As a result, embodiments of the invention described in this specification are well-suited for implementation in a system of many battery-powered nodes N. Alternatively, some or all of host H and nodes N1 through N5 may be connected in a wired network, e.g. Ethernet. In any case, conventional routers, switches, access points, and the like (not shown) for enabling such communications among nodes N1 through N5 and host H will also be installed as necessary.

Figure 2:
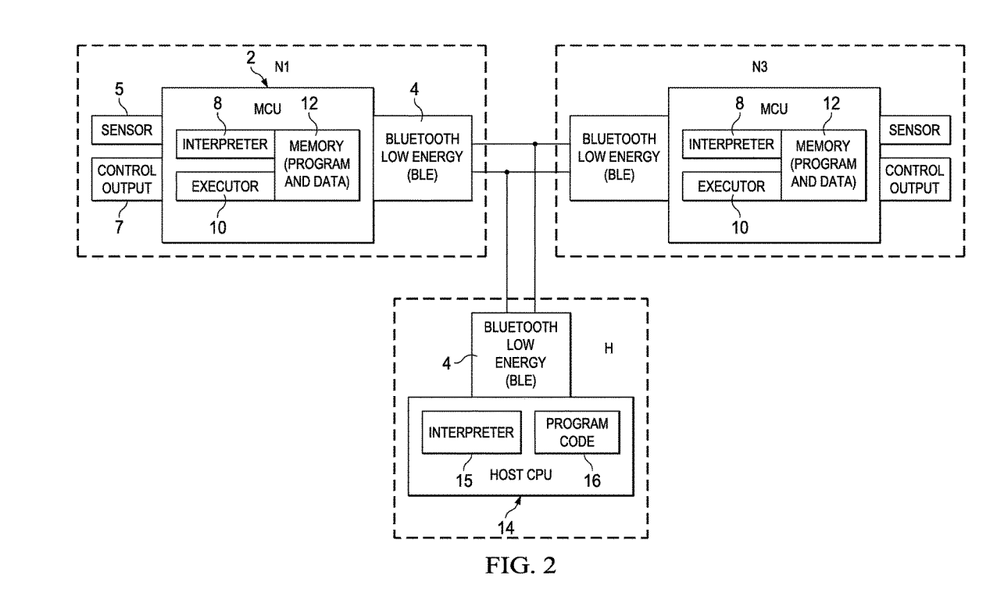
FIG. 2 is an electrical diagram, in block form, of a host system and two nodes in the system of FIG. 1, according to an embodiment of the invention.

FIG. 2 illustrates the high-level architecture of host H and nodes N1, N3, according to an embodiment of the invention. While only two nodes N1, N3 are shown in FIG. 2, it should be evident from FIG. 1 and from the description above that the number of nodes in a particular network as installed may number into the hundreds.

The architecture of nodes N (FIG. 1) according to an embodiment of the invention will be described with reference to node N1 by way of example. The other nodes N2 through N5 may be constructed by a similar architecture or by way of alternative architectures; in any case, it is contemplated that the specific hardware used to realize may differ among nodes N. It is contemplated that those skilled in the art having reference to this specification will be readily able to implement the hardware necessary and useful to realizing the architecture applicable to embodiments of this invention as suitable for a particular application, without undue experimentation.

Node N1 in this embodiment of the invention corresponds to a programmable subsystem including embedded microcontroller unit (MCU) 2, in combination with various peripheral functions. It is contemplated that node N1 will be typically be physically realized by way of a single circuit board on which MCU 2 will be mounted, along with other integrated circuits and discrete components as appropriate for the desired functions of node N1; this circuit board will typically be housed in the appropriate housing or enclosure suitable for its environment. Of course, multiple circuit boards may be used to realize node N1, depending on its functions; node N1 may alternatively be realized as a single integrated circuit, or as a part of a larger electronic system, again depending on its function.

According to embodiments of this invention, MCU 2 is realized by programmable logic having the computational capacity for performing the functions of node N1 described in this specification. In some embodiments, this programmable logic is in the form of any one of a number of microcontroller or microprocessor devices available in the industry. Examples of microcontrollers suitable for use as MCU 2 in node N1 include those of the C2xxxx and CORTEX microcontroller families available from Texas Instruments Incorporated. Other microcontrollers and microprocessors of similar computational capacity, or custom logic circuitry, may alternatively be used for MCU 2, so long as adequate computational capacity is provided. It is contemplated that those skilled in the art having reference to this specification will be readily able to select and implement the appropriate device or circuitry for use as MCU 2 for the particular application.

In this example, node N1 includes several other functions in addition to MCU 2. Communications with other nodes N3 and host H is carried out by way of BLE function 4, which is realized in the conventional manner for Bluetooth communications, and which is coupled to MCU 2 within node N1. Each node N in the networked system includes one or more input/output functions for interacting with the physical environment external to that node. In this example, node N1 includes sensor function 5 and control output circuit 7, each coupled to and controlled by MCU 2. The particular numbers and functions of input/output functions (i.e., sensor functions 5 and control output circuits 7) will depend on the conditions and operations that node N1 is to carry out in the networked system. Examples of sensor function 5 suitable for use in facilities management and industrial control include temperature sensors, motion sensors, humidity sensors, transducers of various types as suitable in industrial instrumentation, cameras, thermal imaging sensors, photosensors, and the like. Control output circuit 7 corresponds to a conventional driver or other circuit of the appropriate output power for the desired output or control function of node N1. Examples of control output circuit 7 suitable for use include analog output driver circuitry, serial and parallel digital outputs, pulse-width-modulated (PWM) output driver circuitry, driver circuitry for an alarm or an annunciator, and LED drivers, to name a few. The number of each of sensor functions 5 and control output circuits 7 will vary according to the desired function of node N1. If the designer of the network wishes for node N1 to serve only as a sensor node, then one or more sensor functions 5 and no control output circuitry 7 will be realized within node N1; conversely, of node N1 is to serve only as a controller node, then one or more control output circuits 7 and no sensor functions 5 will be included. In many cases, it is contemplated that one or more of each of sensor functions 5 and control output circuits 7 will be installed within node N1, but that not all of those functions and circuits may be enabled at any given time during operation of the networked system.

As shown in FIG. 2, MCU 2 in each of nodes N1, N3 is configured to include certain functions particular to the construction and operation of this embodiment of the invention. In this embodiment of the invention, MCU 2 includes interpreter function 8, which corresponds to logic circuitry programmed to interpret received commands and instructions into machine language executable op code and internal control signals. MCU 2 also includes executor function 10, which corresponds to logic circuitry for carrying out the interpreted commands and instructions from interpreter function 8. The particular circuitry included within executor function 10 will depend on the particular architecture of MCU 2 itself; for the example of MCU 2 implemented as a C2xxx microcontroller, executor function 10 includes a digital signal processor core along with a CLA co-processor. Other realizations of MCU 2 will, of course, include other types of logic circuitry within executor function.

MCU 2 also includes memory resource 12, within which program instructions and operand data are stored. The particular arrangement of memory resource 12 can vary, according to embodiments of the invention. In that regard, memory resource 12 may be realized by multiple memories within MCU 2, as well as one or more memories external to MCU 2 but still implemented within node N1. According to embodiments of the invention, memory resource 12 may be realized by a variety of memory technologies, including either or both of volatile memory (e.g., static random-access memory) and non-volatile memory (e.g., flash memory). Program and data memory may occupy separate memory address spaces, or may be contained within a single memory space. For the example of MCU 2 implemented as a C2xxx microcontroller, a modified Harvard architecture is employed by way of which program and data occupy separated regions of a global memory address space, but can be accessed by way of separate hardware pathways.

MCU 2 is also contemplated to include other circuitry and functions beyond those shown in FIG. 2, such other circuitry and functions suitable to its functionality as a stand-alone microcontroller. Examples of such other circuitry and functions include power management circuitry, input and output drivers, analog-to-digital converters, digital-to-analog converters, clock circuits, voltage regulators, among others. These circuits may be also involved in the operation and execution of program instructions by MCU 2 in connection with embodiments of this invention. It is contemplated that those skilled in the art having reference to this specification will readily comprehend other necessary support circuitry included within MCU 2.

As discussed above in connection with FIG. 1, host H may be realized by one of a number of computer types, including personal computers, portable and tablet computers, smartphones, and the like. As such, the architecture and functionality of host H can vary widely from installation to installation. In the system architecture shown in FIG. 2, host H includes host CPU 14. Host CPU 14 will correspond to the central processing unit subsystem used to realize the computer function of host H. For purposes of this embodiment of the invention, host CPU 14 includes circuitry and functionality corresponding to interpreter function 15. Program code 16 is also illustrated as within host CPU 14, stored within program memory by way of conventional circuitry for storing, retrieving, and communicating program instructions.

Host H also includes communications capability for communicating with nodes N; in this example, these communications to and from host H are received and transmitted by an instance of BLE function 4 installed at host H. According to embodiments of this invention, program code can be transmitted from host H to one or more nodes N in the network to dynamically (i.e., while MCU 2 at the target node is operating) update the code stored and executed by their MCUs 2. According to the protocol enforced at BLE functions 4, this transmitted code is in the form of 20 byte lines as the payload of BLE packets, to conserve energy. These small BLE packets and corresponding short code lines are sufficient to dynamically implement a wide range of functions to be performed by a large network of sensors and controllers, according to embodiments of this invention. Of course, other communications protocols may alternatively be used, with the program code line sizes varying accordingly.

As known in the art, microcontrollers such as the C2xxx microcontroller include a number of terminals (i.e., pins) capable of supporting various functions that are under program control. The particular functions performed at these pins can be programmable as inputs, or outputs, or as bidirectional input/output terminals such as a communications terminal (serial or parallel), or as some other functions. Other pins may be configured by the internal hardware of the microcontroller as only an input pin, or only an output pin. In either case, in the context of the architecture of FIG. 2, the functions carried out by these pins can be controlled by program code executed by executor function 10 of MCU 2. For example, the program code can cause a read of a signal at input pins, the driving of a signal at output pins, or the communication of signals in either direction at communications pins. The particular function performed via a given pin of MCU 2 will, of course, depend on the particular sensor function 5 or control output function 6 to which that pin is physically connected within its node N.

Figure 3:
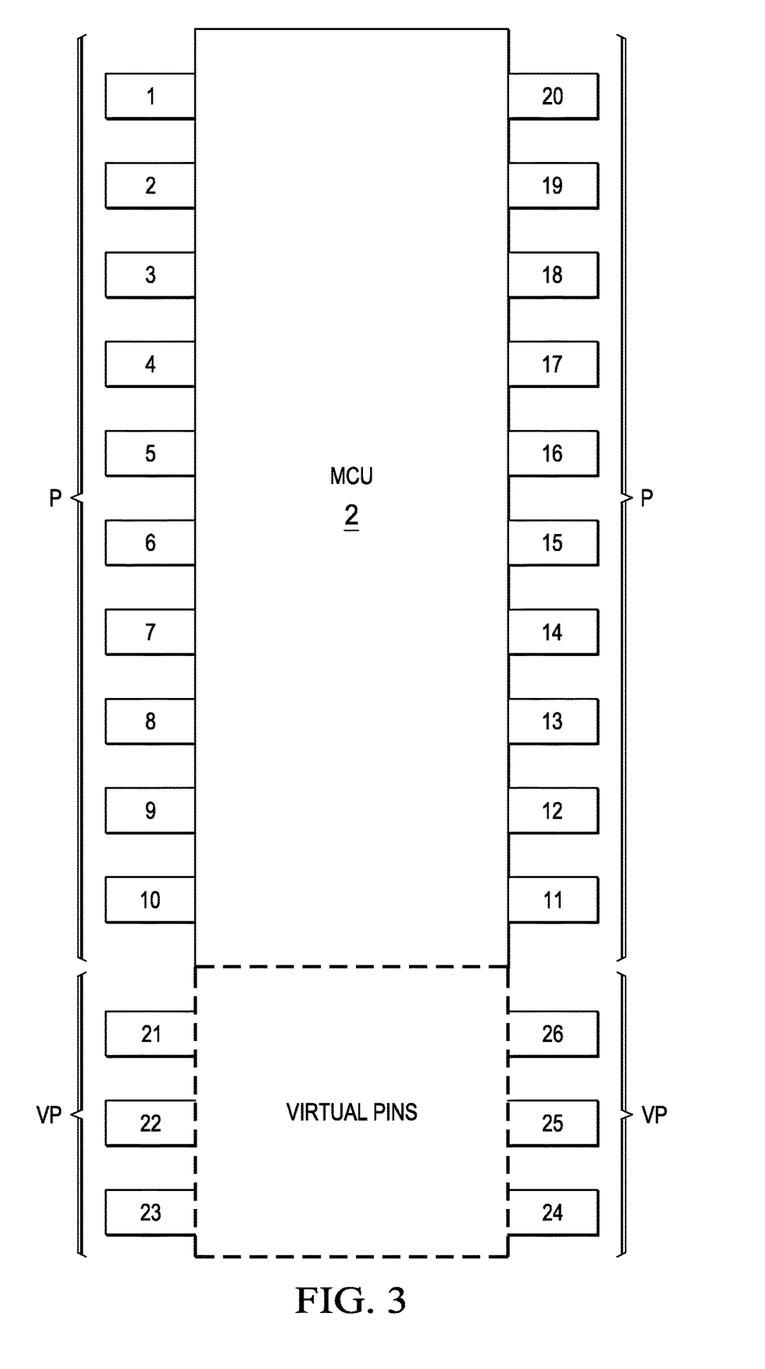
FIG. 3 is a conceptual diagram illustrating the assignment of pins to an integrated circuit in one of the nodes of the system of FIGS. 1 and 2.

According to embodiments of this invention, as will now be described in connection with FIGS. 3 and 4, these pins or terminals of MCU 2 of nodes N perform specific functions under program control, specifically under the control of a corresponding state machine being executed by executor function 10 of MCU 2. A simplified example of a set of physical pins P that are under program control by an instance of MCU 2 is illustrated in FIG. 3. In this example, physical pins P of MCU 2 that are under program control number from 1 to 20; MCU 2 will typically include other physical pins for receiving power and ground voltages, as well as other physical pins that are not under program control, neither of which are shown in FIG. 3. When installed within a node N, these physical pins P will typically be connected to a corresponding sensor function 5 or control output function 6, depending on the desired function to be performed via that pin.

According to embodiments of the invention, mathematical operations and configurations can be carried out on particular ones of pins P, in the context of an instruction loop. Other pins may be associated with states or state variables. For example, one pin (e.g., pin 0) may be mapped to a value indicating the current state being executed, and another pin (e.g., pin 1) may be mapped to a value indicating the immediately previous state that was executed.

Figure 4:
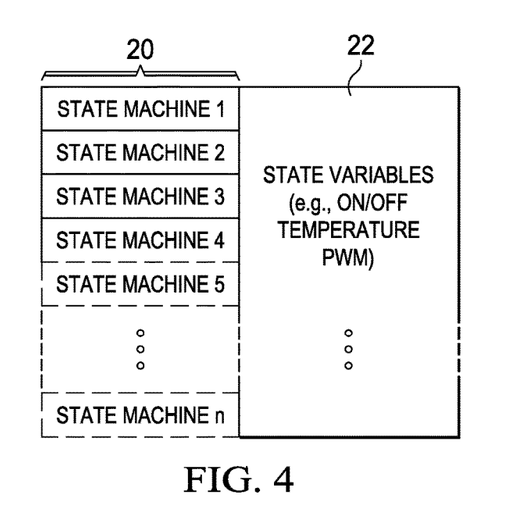
FIG. 4 is a logical diagram illustrating the arrangement of state machines in one of the nodes of the system of FIGS. 1 and 2.

FIG. 4 illustrates the software architecture for programmably controlling pins P within MCU 2. According to embodiments of this invention, MCU 2 operates according to a set of state machines 20. In this example, state machine set 20 includes n state machines, each corresponding to a function or thread of program code executable by executor function 10 of MCU 2 in the architecture of FIG. 2, by way of which the state of selected pins P and thus the operation of sensor function 5 or control output function 7 may be controlled. State variables 22 refer to a portion of memory resource 12 at which various values may be set, stored, and read state machines in set 20. Some of these state variables 22 may be mapped to particular pins P, and mapped state variables 22 corresponding to global values (e.g., the variable corresponding to the current state, i.e. the value at pin 0). According to embodiments of this invention, state variables 22 are shared in the sense that any one of state machines 20 can use any combination of state variables 22 (including values as sensed or output to pins P other than its own) in carrying out its own operation as reflected at its pin P. The manner in which state machines 20 operate in conjunction with pins P and state variables 22 will be described in further detail below, by way of several examples.

MCU 2 may also support one or more "virtual pins" VP. In the example shown in FIG. 3 in which physical pins P number up to pin 20, six virtual pins VP are numbered 21 through 26. Virtual pins VP are "virtual" in the sense that they do not correspond to physical pins at MCU 2 itself, but instead correspond to physical pins at an MCU 2 or other microcontroller device at another node N, specifically a node with which the node containing MCU 2 is in direct communication. Values read or output by MCU 2 at these virtual pins VP are within the set of state variables 22, and are thus can be used by any of state machines 20 within MCU 2 to carry out its own operation. In this manner, for example, MCU 2 can use the conditions sensed at other nodes N within the network in the control of operation of its own pins P.

According to embodiments of this invention, a "reduced" instruction set is provided for the program code executed by state machines 20 in connection with the set of pins P. This reduced instruction set ensures that interpreter 8 of MCU 2 can be kept relatively simple and efficient, and facilitates the communication of program code in small packets, for example within the 20 byte application payload of BLE communications. An example of the reduced instruction set and executed for the architecture of FIGS. 2 through 4 is as follows (presented in the format of [instruction] [operand]):

? [pin]: query that returns the definition of the function assigned to [pin]

IFG/L/E/N/A/O [pin] [value]: "if" statement with one of the options of greater-than, less-than, equals, not, AND, OR (can be followed by a conditional PUT statement)

ENDIF: ends the code executed if the IF condition is met

GET [pin]: query that samples the value at [pin] (optional modifiers such as "+", "−", "*", "/" followed by an (unsigned) integer value will perform that arithmetic operation on the sampled value at [pin] prior to sending; value at [pin] will remain the same)

PUT [pin] [value]: assign the specified [value] to [pin] (the paired arguments [pin] [value] may be repeated) (optional modifiers such as "+", "−", "*", "/" followed by an (unsigned) integer value will modify the value currently at [pin])

SLEEP [pin] [value]: enforce a wait for the state machine assigned to [pin] for a time indicated by [value]

MOV [pin1] [pin2]: as an instruction, places the current value at [pin1] at [pin2]; as a command, configures [pin2] with the current function of [pin1]

MAC [pin]: multiply the current value at [pin] by a multiplier (default value of 1) add the product to the current value at the pin assigned to the MAC function WRITE: store state variable values into non-volatile memory Other instructions, including arithmetic and logical instructions, may alternatively be included in the instruction set if desired. It is contemplated, however, that minimization of the instruction set will facilitate small packet size communications by limiting the number of op code bits required (e.g., only three op code bits are necessary to encode an instruction set size of seven). In embodiments of this invention, MCU 2 executes one state machine 20 at a time. As noted above, pin 0 is assigned to indicate the current state machine, and pin 1 is assigned to indicate the previous state machine. Other interpreted instructions control the mode of operation of the current state:

DO: places MCU 2 into execution mode to execute the current state (at pin 0)

READ: places MCU 2 into a mode for receiving new program instructions

LEARN: places MCU 2 into a self-adaptive mode to learn program instructions issued from another node (e.g., the host)

Of course, the particular commands, instructions and instruction set used in implementations of this invention may vary significantly from those listed above, which are intended only as an illustrative example. Referring to the instructions and commands described above, the operation of nodes N in these modes of operation will be now described with reference to FIGS. 5*a* through 5*e*.

Figure 5A:
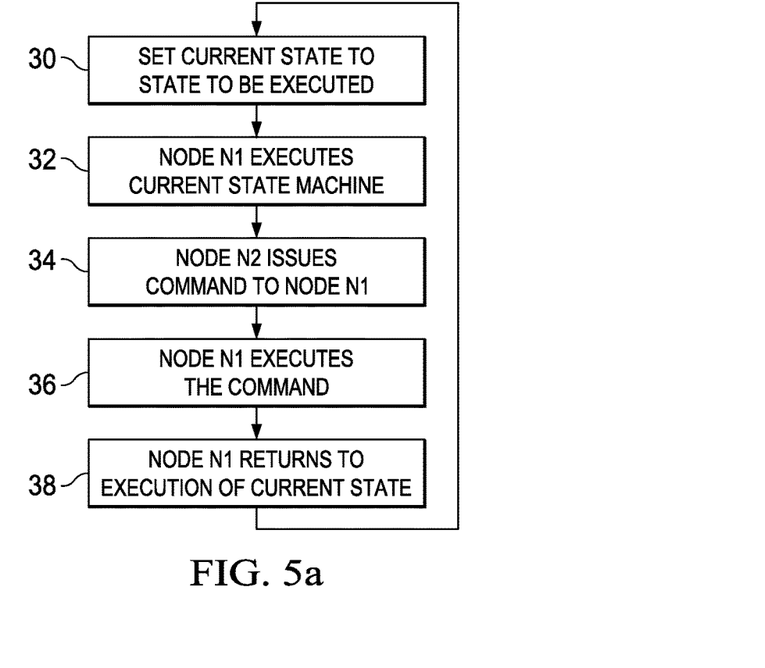
FIG. 5a is a flow diagram illustrating the operation of the system of FIGS. 1 and 2 in a "read" mode according to an embodiment of the invention.

FIG. 5*a* illustrates an example the operation of node N1 in the network of FIGS. 1 and 2 in its execution, or "DO", operational mode. According to this embodiment of the invention, process 30 sets the current one of state machines 20 to be executed in this mode. For example, process 30 may be performed by MCU 2 by interpreter 8 receiving a command from host H or from another node N indicating the current state:

PUT 0 5

In this example, this PUT instruction sets this current value of state 0 to "5" to select state machine 5 as the current state to be executed. In process 32, interpreter 8 receives the DO command to begin execution of this current state, and executor function 10 initiates and continues execution of state machine 5. This state machine includes program code corresponding to a sequence of instructions in the instruction set of MCU 2. For the example of the instruction set described above, these instructions can include the setting of signal values at pins P (for example those pins associated with control output functions 6) by way of PUT instructions, the obtaining of signal values at pins P (for example those pins associated with sensor functions 5) by way of GET instructions, and other operations as indicated by the instruction set. In some embodiments of the invention, these instructions can execute instructions relative to virtual pins VP, by way of which the PUT, GET, MOV, and MAC instructions refer to pins on other nodes N in the network, via BLE function 4 in the architecture of FIG. 2. In this manner, node N1 can obtain the signal values from sensor functions 5 that are physically located at other nodes, and can control and operate control output functions 6 that are physically located at other nodes.

In process 34, during the execution of the current state machine in process 32, node N1 receives a command issued by one of the other nodes N in the network, which in this example is node N2. This command is communicated over the communications network as implemented, for example wirelessly by way of BLE functions 4. The command issued by node N2 to node N1 is interpreted by interpreter 8 of MCU 2 in node N1, and is executed by executor function 10, in process 36. Following execution of this command, because node N1 is in its DO operating mode, node N1 resumes execution of its current state machine (i.e., the state at its pin 0), in process 38.

It is contemplated that MCU 2 may be constructed and configured to execute multiple ones of its state machines 20 while in its DO mode, for example by way of a multithreading architecture. If so, it is contemplated that MCU 2 will include the appropriate scheduling circuitry and functionality for executing those threads in the desired order or time sequence.

According to embodiments of this invention, host H and other nodes N in communication with node N1 are able to dynamically program node N1, as well as update program code already installed and executing at node N1. The extent of this programming may range from simply updating a line of program code in one of state machines 20, for example by changing a comparison limit of an IF instruction, to programming the entire code of a state machine that previously did not exist at target node N1. This ability of host H and each node N to update and program other nodes N in the networked system, in a dynamic manner following installation and operation of the network of sensors and controllers, provides a great deal of flexibility in the functions carried out by the system, including the ability of the functionality of the system to respond to changing environmental and other conditions.

Figure 5B:
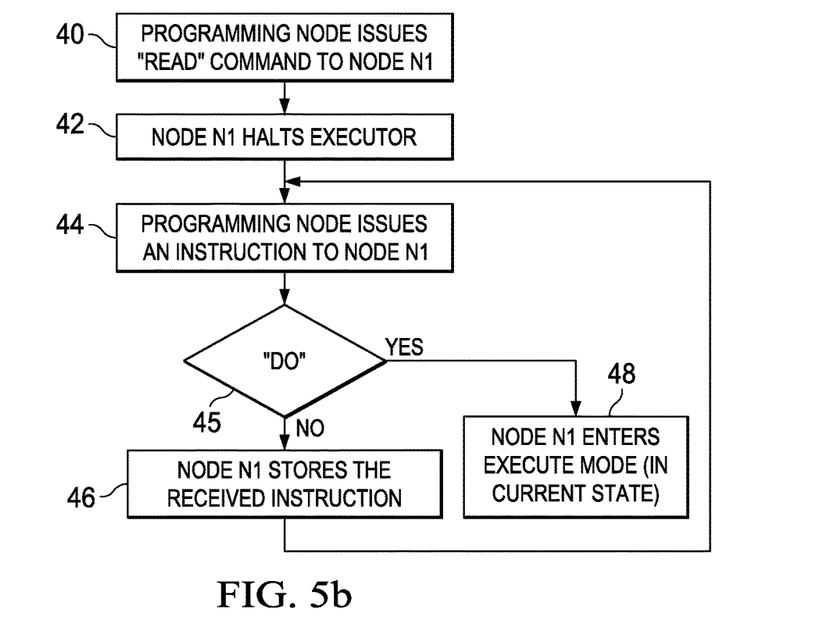
FIG. 5b is a flow diagram illustrating the operation of the system of FIGS. 1 and 2 in an "execute" mode according to an embodiment of the invention.

FIG. 5*b* illustrates an example of the operation of node N1 in the network of FIGS. 1 and 2 in its programming, or "READ", operating mode. In process 40, the programming of node N1 begins with the programming node (either host H or one of the other nodes N in the system) placing target node N1 into a READ operating mode. This is accomplished by the programming node communicating the READ command to node N1, in this example. Interpreter 8 in MCU 2 of node N1 interprets the READ command, and causes executor function 10 to halt the execution of the current state machine indicated by pin 0, in process 42. The READ operating mode is then in place at node N1.

In process 44, the programming node then communicates to node N1 a sequence of instructions that is to become part of the code stored in the program memory of memory resource 12 at MCU 2 in node N1. In this READ mode, these received instructions are not executed by MCU 2 at node N1 upon receipt, as in the case of a received command while in the DO mode. Rather, interpreter 8 operates to interpret the instructions only to the extent of detecting a DO command or other command for exiting READ mode, and executor function 10 stores the incoming instructions in the proper sequence at a retrievable location of memory resource 12. In decision 45, interpreter 8 determines whether the incoming instruction is a DO command (or other exit command). If this instruction is not a DO (or other exit) command (decision 45 is "no"), node N1 remains in the READ operating mode, and stores the received instruction at the appropriate location of memory resource 12 in process 46. The process then continues, with the next instruction from the programming node being issued and received in process 44. Following the sending of the last instruction in the sequence to be programmed, the programming node will issue the DO command in process 44. Upon interpretation of this DO command by interpreter 8 (decision 45 is "yes"), node N1 exits the READ mode and re-enters the DO operating mode, resuming execution of the current state machine indicated in state 0 in process 48.

An example of the command and instruction sequence for programming target node N1 by way of the READ mode, according to an embodiment of the invention, follows below. Comments to a command or instruction follow the "//" indicator in each instruction line. In this example, target node N1 is first queried and configured by host H while in the DO operating mode, by way of commands:

? 6 //queries the current function of pin 6
ANALOG INPUT //response from target node N1 indicating that pin 6 is an analog signal input
? 7 //queries the current function of pin 7
ANALOG INPUT //response indicating that pin 5 is an analog signal input
? 15 //queries the current function of pin 15
PULSED OUTPUT
? 21 //queries the current function of (virtual) pin 21
MAC //a multiply-and-accumulate function is carried out at virtual pin 21

In this example, pins 6, 7, and 15 are to be set as the "x", "y", and "z" channels for incoming signals from an accelerometer. It is therefore necessary to configure pin 15 to also serve as an analog input, which is accomplished by another command:

MOV 6 15 //sets the function of pin 15 to be the same as that of pin 6

Following this configuration and verification by way of commands, target node N1 is next placed into the READ mode to receive program code for its state machine 5, as communicated to it by another node, in this case host H:

PUT 0 5 //set current state to state 5
READ //enter READ mode to receive program code for state 5
PUT 6 -512 //modifies the sampled value at pin 6 by subtracting a DC bias of 512 from its current value
PUT 7 -512 //modifies the sampled value at pin 7 by subtracting a DC bias of 512
PUT 15 -512 //modifies the sampled value at pin 15 by subtracting a DC bias of 512
MAC 6 //multiplies the calculated value at pin 6 by the default multiplier (=1) and adds to the current value at MAC pin 21
MAC 7 //multiplies the calculated value at pin 7 by the default multiplier (=1) and adds to the current value at MAC pin 21
MAC 15 //multiplies the calculated value at pin 15 by the default multiplier (=1) and adds to the current value at MAC pin 21
IFG 21 200 //execute the statements within the loop if the result of the MAC instructions at pin 21 exceeds 200
WRITE //store all analog values in memory resource 21 (if IFG condition is satisfied)
ENDIF
DO //exit READ mode into DO mode, and execute state 5 (i.e., the newly programmed code)

Upon each execution of this newly-programmed state machine, the analog values at pins 6, 7, 15 are modified (i.e., subtracting the value indicated in the corresponding GET instruction) and accumulated, with the result tested against a limit. In this example, analog data acquisition is performed at the specified periodicity, but the pin values modified by the PUT instructions are not updated until the current state machine completes an execution cycle (to allow the modified values to be used in a code loop). Higher frequency data capture can be implemented by use of the WRITE command, which samples all analog values and stores the data in a buffer of memory resource 12 for local or remote processing; double buffering may be used to allow continuous capture and processing.

According to embodiments of this invention, the "wiring" of nodes N includes the use of virtual pins that carry new contextual meanings, depending on the particular assignments of those virtual pins. For example:

? 24 //the current function of virtual pin 24
SWARM

In this embodiment of the invention, the "SWARM" assignment corresponds to a list of nodes N constituting a "swarm". A node in the swarm can use this virtual pin 24 to issue commands to each of the other nodes in the swarm. For example:

PUT 24 ECFE1104A3 //adds a node with the specified MAC address to the swarm of connected nodes Instructions now executed by one of the nodes (e.g., node N1) to its virtual pin 24 having the SWARM function will have effect at each of the nodes N in the swarm. For example, if node N1 executes the instruction:

GET 2 to obtain the value at its own physical pin 2, node N1 can communicate that value to each of the nodes N in the swarm by way of a MOV of the value at pin 2 to its (virtual) pin 24. For the case in which the value at pin 2 was 50 at the time of this GET instruction, node N1 then executing the instruction:

MOV 2 24 //moves the value at pin 2 to the SWARM pin 24 which, because of the SWARM function, causes the following instruction at each of the nodes N in the swarm assigned to pin 24:

PUT 2 50 //50 being the value at pin 2 of node N1

Nodes N in the swarm can thus respond to the condition at pin 2 of node N1, effectively "swarming" to the condition sensed by node N1.

Other functions, such as register instructions, may be accomplished in a similar manner. For example, it is contemplated that an external circuit having registers may be hardware-connected to node N1, for example by way of a serial peripheral interface (SPI). In similar manner as described above in connection with the SWARM, that connection may be associated with a virtual pin. Node N1 can communicate the state of one of its physical pins to a register of the physically connected circuit in similar fashion as described above by way of the MOV instruction of values from its physical pin to the virtual pin; conversely, the contents of a register may be read by node N1 by executing a MOV instruction of values from its virtual pin to its physical pin.

As mentioned above, the READ mode may be used simply to replace one or more lines of code. An example of the instruction sequence for replacing such a line of code follows. To accomplish this code replacement, an "index" value may be transmitted as part of the PUT instruction setting the current state prior to the READ command. This example replaces the second line of the program code in the previous example:

PUT 0 5 1 2 //set the current state to state 5, and set the line index (i.e., the program counter stored as parameter #1 for this state machine) to 2
READ
IFG 5 5000 //changes the limit of the IFG instruction from 5000 to 3000
DO //exits READ mode to DO mode, and executes the current state (state 5)

As a result, the program code for state 5 is easily changed by way of the READ instruction.

According to some embodiments of the invention, the program code of each node N in the networked system of FIGS. 1 and 2 can also be installed or altered in another programming code referred to in this specification as the "LEARN" mode. In this LEARN mode, the target node N being programmed is not only directly reading instructions transmitted from another node in the networked system, but is also executing those instructions, and inferring temporal information and conditional behavior in response to changes in sensed conditions. Upon completion of the LEARN mode, the target node N is programmed in a manner based on its observed behavior when under user control (or, in some cases, when another node in the network is under user control), and as such is able to mimic the response of the user should similar conditions occur in the future. This ability enables the network of sensors and controllers to adapt their operation in a manner akin to "artificial intelligence", significantly enhancing the capability of the network as a result.

Figure 5C:
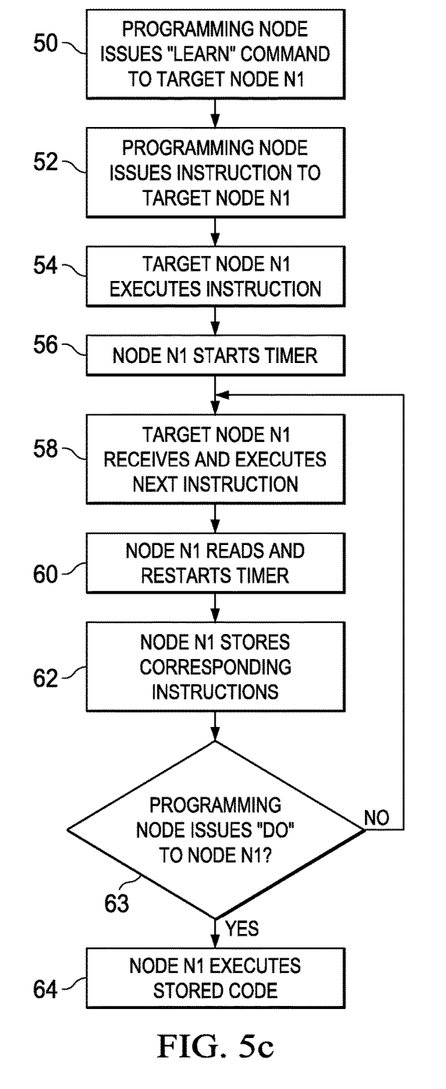
FIGS. 5c and 5d are flow diagrams illustrating the operation of the system of FIGS. 1 and 2 in a "learn" mode according to an embodiment of the invention.
Figure 5D:
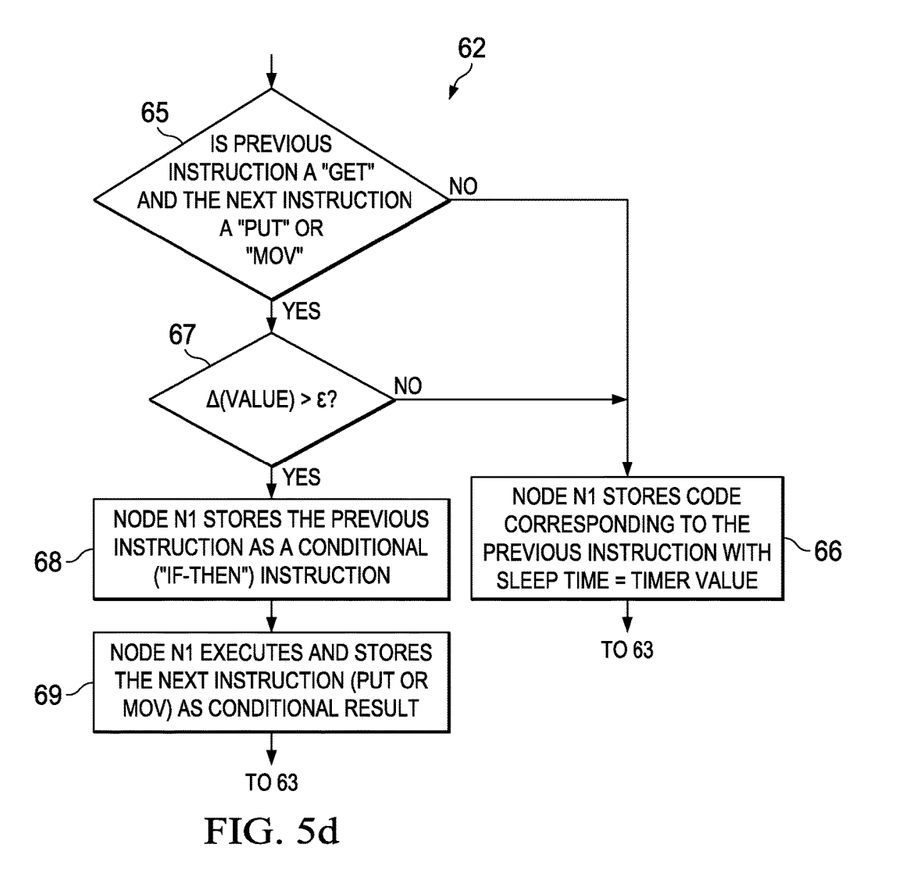

FIGS. 5c and 5d are flow diagrams of an example of the operation of target node N1 in the LEARN operating mode, according to an embodiment of the invention. In this example, host H issues a LEARN command to target node N1 in process 50 (FIG. 5c), initiating this mode. Target node N1 may previously have been in the READ mode, by way of which it has received and stored instructions in its program memory; the instructions stored via the LEARN mode (as described below) will be appended to those recently stored instructions. In this way, the programming node can define initialization of the state machine that will be programmed via the LEARN mode, for example. Target node N1 may have instead been in the DO operating mode at the time it receives the LEARN command. In either case, it is contemplated that the current state at target node N1 (i.e., the state machine to be programmed by this instance of the LEARN mode) corresponds to the current state of target node N1. After invoking the LEARN mode in process 50, the programming node (host H in this example) issues an instruction to target node N1 in process 52. Target node N1 receives this instruction from host H, and executes that instruction in process 54.

According to this embodiment of the invention, the time elapsed between the execution of an instruction in process 54 and the execution of the next instruction received from host H is considered by target node N1 in the program code that it will store. This temporal relationship between the execution of successive instructions is often important in the operation of a sensor node, as it indicates the frequency with which a particular condition is being monitored. As such, target node N1 starts an internal timer (e.g., a counter circuit) in process 56, following its execution of the received instruction in process 54. In process 58, target node N1 receives the instruction code of the next instruction from host H over the communications network, and executes that instruction. In process 60, target node N1 reads the current time value of its internal timer, and restarts the timer to begin measuring the time elapsed from this next instruction.

In process 62, target node N1 stores program code for one or more of the received and executed instructions in its memory resource 12, for the current state machine. FIG. 5d illustrates, in more detail, the manner in which process 62 is carried out by target node N1, according to an embodiment of the invention. Upon receipt and execution of the next instruction in process 58, executor function 10 of MCU 2 at target node N1 executes decision 65 to determine whether the previous instruction (i.e., the instruction executed in process 54) was a GET instruction and the next instruction (i.e., the instruction executed in process 58) was a particular type of instructions pertaining to an action on the part of target node N1, for example a PUT or MOV instruction. If this combination of instructions was not received and executed (decision 65 is "no"), process 66 is executed at target node N1 to store program code corresponding to the previous instruction as program code in its memory resource 12, in combination with the timer value read in process 60 as the operand of a SLEEP instruction, as described above. The stored program code may not necessarily be exactly the very instruction that was received and executed, but will based on that instruction and the appropriate inferences available to target node N1. Target node N1 then determines whether the programming node (host H) next issues a DO command, in decision 63. If not (decision 63 is "no"), target node N1 repeats the operation from its receipt and execution of the next instruction in process 58.

On the other hand, in this example, if the previous instruction is a GET instruction followed by a PUT or MOV instruction (decision 65 is "yes"), executor function 10 determines whether the data value read at the pin indicated by the GET instruction executed by target node N1 in process 54 changed from a prior value by greater than some tolerance limit ϵ. In this regard, it is contemplated that target node N1 has either received a prior value for that pin (e.g., an initialization value), or that target node N1 has itself executed a previous GET instruction for the indicated pin and collected one or more prior values. The tolerance limit ϵ is contemplated to be stored in a configuration register, initialized by host H (e.g., during the READ mode programming prior to invoking this instance of the LEARN mode) or is otherwise set at target node N1. If the newly observed value is within the tolerance limit ϵ of its prior value (decision 67 is "no"), then the corresponding timer value will be included as the operand for a SLEEP instruction to be stored in process 66, as described above. But if the most recent value obtained by the GET instruction executed by the observed node N has changed by more than the tolerance limit ϵ (decision 67 is "yes"), target node N1 will infer that the instruction executed in process 58 (i.e., a PUT or MOV instruction) was in response to that significant change in the condition being monitored by the pin indicated in the GET instruction. This inference is inserted into the program code stored at target node N1 in this LEARN mode by its storing of a conditional instruction (e.g., an IF instruction) corresponding to the executed GET instruction in process 68, as program code in memory resource 12. For example, according to the instruction set described above in this embodiment of the invention, process 68 will store an IF instruction to test the value at the pin indicated in the previous GET instruction (the IF instruction includes an implied GET) against a threshold limit that corresponds to the tolerance limit ϵ. The threshold limit may be inferred by target node N1 from the recently observed values. For example, the threshold limit may be set at a midpoint value between the value obtained in the previous GET instruction (process 54) and the value obtained in the next GET instruction (process 58). Following the conditional (e.g., IF) instruction in the stored program code, target node N1 stores a SLEEP instruction corresponding to the measured elapsed time after the GET instruction, followed by the PUT or MOV instruction that was executed in process 58 after the GET instruction, which in turn is followed by an ENDIF or other terminator for the conditional program code. Control then reverts to decision 63, in which target node N1 determines whether the programming node (host H) next issues a DO command. If not (decision 63 is "no"), the process is repeated with the receipt and execution of the next instruction from host H.

Referring back to FIG. 5c, upon target node N1 receiving a DO command or other command to exit the LEARN mode from host H (decision 63 is "yes"), target node N1 exits the LEARN mode and enters the execute operating mode, in process 64. The current state at target node N1, namely the state machine programmed by this instance of the LEARN mode, then begins execution in the manner described above relative to FIG. 5a.

In the above description, target node N1 is described as storing instructions as they are received. Alternatively, it is contemplated that target node N1 may be implemented so that it waits to generate and store program instructions, with the appropriate inferences, until the LEARN mode is exited upon receiving the DO command.

An example of the program code stored by a target node N1 in the LEARN mode, in response to instructions forwarded to it by host H, will be instructive. In this example, host H issues the following set of commands and instructions to target node N1, separated by wait times, for an example in which the conditions at the monitored pin change significantly:

LEARN
GET 6 //node N1 returns an analog input value of 100 from pin 6
(host H waits two seconds before issuing the next instruction)
GET 6 //this time, node N1 returns an analog input value of 200 from pin 6
(host H waits one second before issuing the next instruction)
PUT 2 100 //set pin 2 to a value of 100
DO In this example, target node N1 will have executed each of the GET instructions and the PUT instruction upon receipt, obtaining the values indicated above, and will have measured the time lapse following each of those GET instructions. Because of the significant change in the value obtained from pin 6 in the second GET instruction relative to the first GET instruction, according to this embodiment of the invention, target node N1 infers that the shorter wait period and the PUT instruction are in response to the significant increase in the value at pin 6. Accordingly in this example, following the process described above in FIGS. 5c and 5d, target node N1 stores the following program code in association with its current state machine:

SLEEP 100 //corresponds to a two second wait time
IFG 6 150 //threshold limit of 150 is the midpoint of the values 100 and 200 received during the LEARN operation
SLEEP 100 //corresponds to a one second wait time
PUT 2 100 //set pin 2 to a value of 100 in response to the pin 6 value exceeding the threshold limit of 150
ENDIF In the DO execution mode, this code is a loop that tests the value at pin 6 against the threshold limit of 150 every two seconds, until the value exceeds that limit, following which pin 2 will be set to a value of 100 after a one second delay. In either case, the loop will continue to be executed until target node N1 exits this state machine. As evident from this example, the first GET instruction issued to target node N1 by host H in LEARN mode was not itself stored in the eventual program code; but instead that GET was included within the code loop that was eventually stored.

Alternatively, it is contemplated that nodes N can receive instruction codes based on operations occurring at other nodes different from itself and from host H or the programming node. For example, host H can invoke the LEARN mode at target node N1 in a way that it programs a state machine based on instructions executed at a different node N2 (i.e., the "observed" node).

The LEARN operating mode carried out by nodes in the networked system according to this embodiment of the invention enables the various nodes to autonomously adapt their operation in response to sensed conditions at remote locations in the network. In effect, the network nodes can "swarm" to respond to a current condition in the monitored environment, without having previously been programmed to respond in that manner. Indeed, the particular manner in which the nodes are to respond to the sensed conditions may not be known at the time of installation, but according to this embodiment of the invention that response approach can be adaptively and dynamically updated at the nodes later.

Figure 5E:
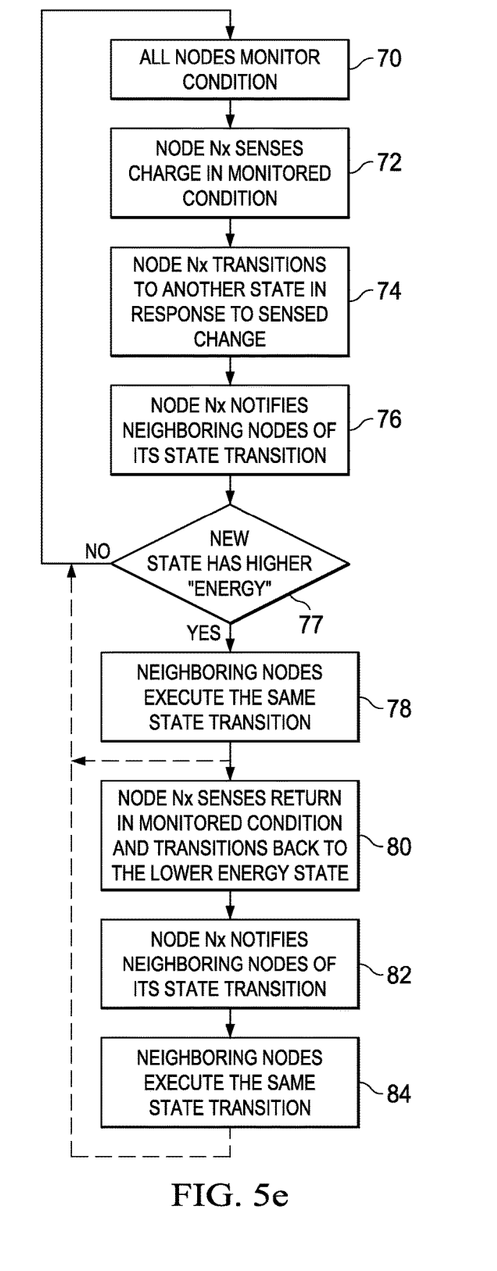
FIG. 5e is a flow diagram illustrating the operation of the system of FIGS. 1 and 2 to perform "state reflection" according to an embodiment of the invention.

According to an embodiment of the invention, nodes in the networked system may include the ability to carry out "state reflection" while in the DO operating mode. This "state reflection" function allows a node in the network to take action in response to conditions that it cannot itself sense, for example in anticipation of a change in condition that is likely to happen soon at its monitored location. This approach similarly allows the network sensor and controller nodes to "swarm" their operation in response to a change in condition. FIG. 5e illustrates an example of the behavior of nodes N in the network of FIGS. 1 and 2 in performing "state reflection" according to this embodiment of the invention.

In process 70, all relevant nodes N in the network are in their DO operating state, each executing their respective current states (some or all of which are likely to be the same state across nodes N). The "state reflection" function initiates with process 72, in which one of the nodes, namely node Nx, senses a significant change in the condition that it is currently monitoring. It is contemplated that node Nx may determine this significant change in any conventional manner, for example based on the change from the current value as compared with a prior data value sensed at the same pin of node Nx, or statistically, or in some other manner. In response to this change in conditions as detected in process 72, node Nx transitions to another one of its state machines 20 in process 74. And in process 76, node Nx notifies other nodes N in the network of its state transition and the state machine to which it has transitioned, in process 74. The particular "neighboring" nodes to which node Nx communicates its transition can vary. For example, node Nx may communicate the change to all nodes N in the network, or alternatively to a subset of nodes N such as those physically nearest to node Nx. Host H may or may not be notified, depending on the desired function of the network.

Decision 77 is then executed at each of the neighboring nodes N receiving the notification from node Nx of its state transition. According to this embodiment of the invention, each of the state machines 20 at node N is assigned an "energy" value. Each node N maintains a table or other memory data, by way of which it can compare the energy levels of its states.

In this embodiment of the invention, these energy values may correspond to a level of activity or awareness on the part of node N. For example, it is contemplated that many modern sensor and controller networks will be made up of battery-powered network nodes, for which minimization of power consumption at the nodes is of significant importance. In that case, a low energy (i.e., lower power consumption) state for nodes N including a motion detection state machine (and a corresponding motion sensor) may be the state in which no motion is detected, while a higher energy (i.e., higher power consumption) state may correspond to a state in which visual or thermal images of the vicinity of node N are obtained via the appropriate camera or thermal imaging sensor. In this example, the transition from the motion detection state to the image capture state may occur upon the motion sensor at a node detecting motion in its vicinity, from which the motion detection state machine concludes that a person is in the vicinity of node N ("person-in-room") and its node N transitions to the image capture state machine.

Decision 77 thus determines whether the state to which node Nx transitioned is a higher energy state than its previous state. If not (decision 77 is "no"), neighboring nodes N remain in their current state, monitoring conditions in their respective vicinities. If the new state at node Nx, as communicated to its neighboring nodes N, has a higher energy than the previous state (decision 77 is "yes"), neighboring nodes N take action by executing a state transition to this same, higher energy, state machine, in process 78. For the example given above in which node Nx transitioned to capturing images of its vicinity, neighboring nodes N will transition to that same image capture state in process 78, and will begin executing the corresponding state machine. In this new state, monitoring process 70 will be repeated, in order to detect one of the nodes sensing a significant change in the currently monitored condition (in this new state) and making a transition to yet another higher energy state (processes 72, 74).

Also according to this embodiment of the invention, the original node Nx may sense that conditions causing the previous state transition have resolved to such an extent that this node Nx makes a state transition back to the prior, lower energy, state, in process 80. For the above example, node Nx may determine, from its captured thermal images, that a person has not been in its vicinity for some time, in response to which it transitions back to its motion detection state machine. In process 82, node Nx notifies neighboring nodes N of its state transition to the lower energy state. And in process 84, these neighboring nodes N then make a state transition to a state machine having a lower energy value. This lower energy state machine may be the same state as that now being executed at node Nx, or may be another lower energy state (e.g., the state at which the neighboring nodes were previously operating). Monitoring process 70 is then again executed at each of nodes N in the network as before, to detect transitions at any of nodes N from this lower energy state.

Embodiments of this invention provide many important advantages in the ability of a networked system to efficiently and adaptively carry out sensing and control in a wide variety of applications. One important advantage is the ability of a host computer to install and update operational program code in one, some or all of the nodes of the networked system, including the ability to update or change the program code dynamically during operation of the system. This ease and efficiency of programming the network nodes greatly reduces the cost of installation and cost of ownership, especially in complex networked sensor and control systems having hundreds of nodes.

Another advantage of embodiments of this invention is the ability of the network nodes to adapt the program code among themselves, particularly by allowing one node to update or install program code in other nodes in the network. This ability is enhanced by network nodes that have a "learn" mode, according to an embodiment of the invention, in which operational behavior at a network node, for example as may be controlled by a user at a host system, is stored as program code in the nodes. The further ability of state transitions to be "reflected" from one node to other neighboring nodes provides real-time adaptability in the functionality of the network, including a heightened ability to rapidly respond to changing conditions.

Other advantages of the networked system according to embodiments of the invention are also contemplated. An example of one such advantage can be realized by enabling the host computer to operate as a node in a fashion that allows other nodes in the network to update the program code of the host computer itself—effectively performing a "takeover" of the host computer functionality. These and other advantages will be apparent to those skilled in the art having reference to this specification.

While this invention has been described according to its embodiments, it is of course contemplated that modifications of, and alternatives to, these embodiments, such modifications and alternatives obtaining the advantages and benefits of this invention, will be apparent to those of ordinary skill in the art having reference to this specification and its drawings. It is contemplated that such modifications and alternatives are within the scope of this invention as subsequently claimed herein.

What is claimed is:

1. A programmable system node comprising:
   (a) physical environment pins for at least one of a sensor input pin and a control output pin;
   (b) network node communication pins separate from the physical environment pins;
   (c) an embedded microcontroller unit, including:
      (i) memory circuitry for storing program code, data, and state variables;
      (ii) interpreter logic circuitry coupled to the communication pins and programmed to interpret commands and instructions received on the communication pins into machine language executable program code and internal control signals;
      (iii) state machines, each state machine includes program code corresponding to one sequence of instructions in a set of instructions, the state machines being coupled to the physical environment pins and the state variables of the memory circuitry, and each state machine being separately selectable; and (iv) executor logic circuitry coupled to the interpreter logic circuitry and to the state machines to select a state machine to carry out the interpreted commands and instructions from the interpreter logic circuitry, the executor logic circuitry initiating and continuing execution of the selected state machine, in which the executor logic circuitry receives a PUT command selecting the selected state machine for execution and setting a signal value at a pin associated with that particular state machine.

2. The node of claim 1 in which one of the state machines is connected to a sensor input pin.

3. The node of claim 1 in which one of the state machines is connected to a control output pin.

4. The node of claim 1 in which a received instruction indicates one of the state machines and one of the states of that state machine.

5. The node of claim 1 in which a received instruction indicates one of the state machines and one of the states of that state machine for at least one of receiving sensor values from a sensor input pin and operating control functions at a control output pin.

6. The node of claim 1 in which the executor logic circuitry initiates and continues execution of multiple ones of the selected state machines in one mode.

7. A programmable system node comprising:
(a) physical environment pins for at least one of a sensor input pin and a control output pin;
(b) network node communication pins separate from the physical environment pins;
(c) an embedded microcontroller unit, including:
(i) memory circuitry for storing program code, data, and state variables;
(ii) interpreter logic circuitry coupled to the communication pins and programmed to interpret commands and instructions received on the communication pins into machine language executable program code and internal control signals;
(iii) state machines, each state machine includes program code corresponding to one sequence of instructions in a set of instructions, the state machines being coupled to the physical environment pins and the state variables of the memory circuitry, and each state machine being separately selectable; and
(iv) executor logic circuitry coupled to the interpreter logic circuitry and to the state machines to select a state machine to carry out the interpreted commands and instructions from the interpreter logic circuitry, the executor logic circuitry initiating and continuing execution of a selected state machine, in which the executor logic circuitry receives a GET command selecting the selected state machine for execution and setting a signal value at a pin associated with that particular state machine.

8. The node of claim 7 in which one of the state machines is connected to a sensor input pin.

9. The node of claim 7 in which one of the state machines is connected to a control output pin.

10. The node of claim 7 in which a received instruction indicates one of the state machines and one of the states of that state machine.

11. The node of claim 7 in which a received instruction indicates one of the state machines and one of the states of that state machine for at least one of receiving sensor values from a sensor input pin and operating control functions at a control output pin.

12. The node of claim 7 in which the executor logic circuitry initiates and continues execution of multiple ones of the selected state machines in one mode.

13. A programmable system node comprising:
(a) physical environment pins for at least one of a sensor input pin and a control output pin;
(b) network node communication pins separate from the physical environment pins;
(c) an embedded microcontroller unit, including:
(i) memory circuitry for storing program code, data, and state variables;
(ii) interpreter logic circuitry coupled to the communication pins and programmed to interpret commands and instructions received on the communication pins into machine language executable program code and internal control signals;
(iii) state machines, each state machine includes program code corresponding to one sequence of instructions in a set of instructions, the state machines being coupled to the physical environment pins and the state variables of the memory circuitry, and each state machine being separately selectable; and
(iv) executor logic circuitry coupled to the interpreter logic circuitry and to the state machines to select a state machine to carry out the interpreted commands and instructions from the interpreter logic circuitry, the executor logic circuitry initiating and continuing execution of a selected state machine, in which the executor logic circuitry receives a READ command selecting the selected state machine for execution and setting a signal value at a pin associated with that particular state machine.

14. The node of claim 13 in which one of the state machines is connected to a sensor input pin.

15. The node of claim 13 in which one of the state machines is connected to a control output pin.

16. The node of claim 13 in which a received instruction indicates one of the state machines and one of the states of that state machine.

17. The node of claim 13 in which a received instruction indicates one of the state machines and one of the states of that state machine for at least one of receiving sensor values from a sensor input pin and operating control functions at a control output pin.

18. The node of claim 13 in which the executor logic circuitry initiates and continues execution of multiple ones of the selected state machines in one mode.

* * * * *